United States Patent
Yoshida (10) Patent No.: US 7,427,250 B2
(45) Date of Patent: Sep. 23, 2008

(54) RING TYPE HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 11/083,411

(22) Filed: Mar. 18, 2005

(65) Prior Publication Data

US 2005/0272542 A1    Dec. 8, 2005

(30) Foreign Application Priority Data

Jun. 4, 2004    (JP)    ............... 2004-167635

(51) Int. Cl.
*F16H 7/08*    (2006.01)
*F16H 7/22*    (2006.01)
(52) U.S. Cl. .................... 474/110; 474/109
(58) Field of Classification Search ............. 474/110, 474/109
See application file for complete search history.

(56) References Cited

U.S. PATENT DOCUMENTS

| | | | |
|---|---|---|---|
| 4,792,322 A | 12/1988 | Goppelt et al. | |
| 5,704,860 A | 1/1998 | Stief | |
| 5,707,309 A * | 1/1998 | Simpson | 474/110 |
| 6,474,320 B1 * | 11/2002 | Modien | 123/568.21 |
| 6,849,012 B2 * | 2/2005 | Poiret et al. | 474/110 |
| 2003/0008738 A1 * | 1/2003 | Rossato et al. | 474/110 |

FOREIGN PATENT DOCUMENTS

| | | |
|---|---|---|
| EP | 1 197 679 A | 4/2002 |
| JP | 3226037 | 8/2001 |
| JP | 2003329091 | 11/2003 |
| JP | 2003329091 A * | 11/2003 |

* cited by examiner

*Primary Examiner*—Richard W L Ridley
*Assistant Examiner*—Terence Boes
(74) *Attorney, Agent, or Firm*—Howson & Howson LLP (57) ABSTRACT

In a hydraulic tensioner a cylindrical plunger slidably protrudes from a plunger-accommodating hole in a tensioner housing. A check valve unit allows oil to flow under pressure into a high pressure chamber formed by the plunger and the housing, but blocks reverse flow. The plunger is biased in the protruding direction by a spring located in the high pressure chamber. The plunger has an annular groove in its outer circumferential surface, and a C-shaped ring disposed in the groove is resiliently biased radially outwardly against the inner circumferential wall of the plunger-accommodating hole. A radial clearances is provided between the ring and the bottom of the groove, and the ring also fits into the groove with an axial clearance.

4 Claims, 7 Drawing Sheets

RING TYPE HYDRAULIC TENSIONER

FIELD OF THE INVENTION

This invention relates to hydraulic tensioners of the kind used for maintaining proper tension in timing chains of internal combustion engines. It relates more particularly to an improved tensioner structure for preventing impact noise during engine start-up.

BACKGROUND OF THE INVENTION

Hydraulic tensioners have been widely used to maintain tension in power transmission media such as timing chains, used for transmitting rotation from the crankshaft to one or more camshafts in an internal combustion engine. The tensioners not only maintain proper tension in the transmission medium, but also prevent vibration. A typical hydraulic tensioner is depicted and described in Japanese Patent Publication No. 3226037 (pages 1 and 2, FIG. 6).

Figure 7:
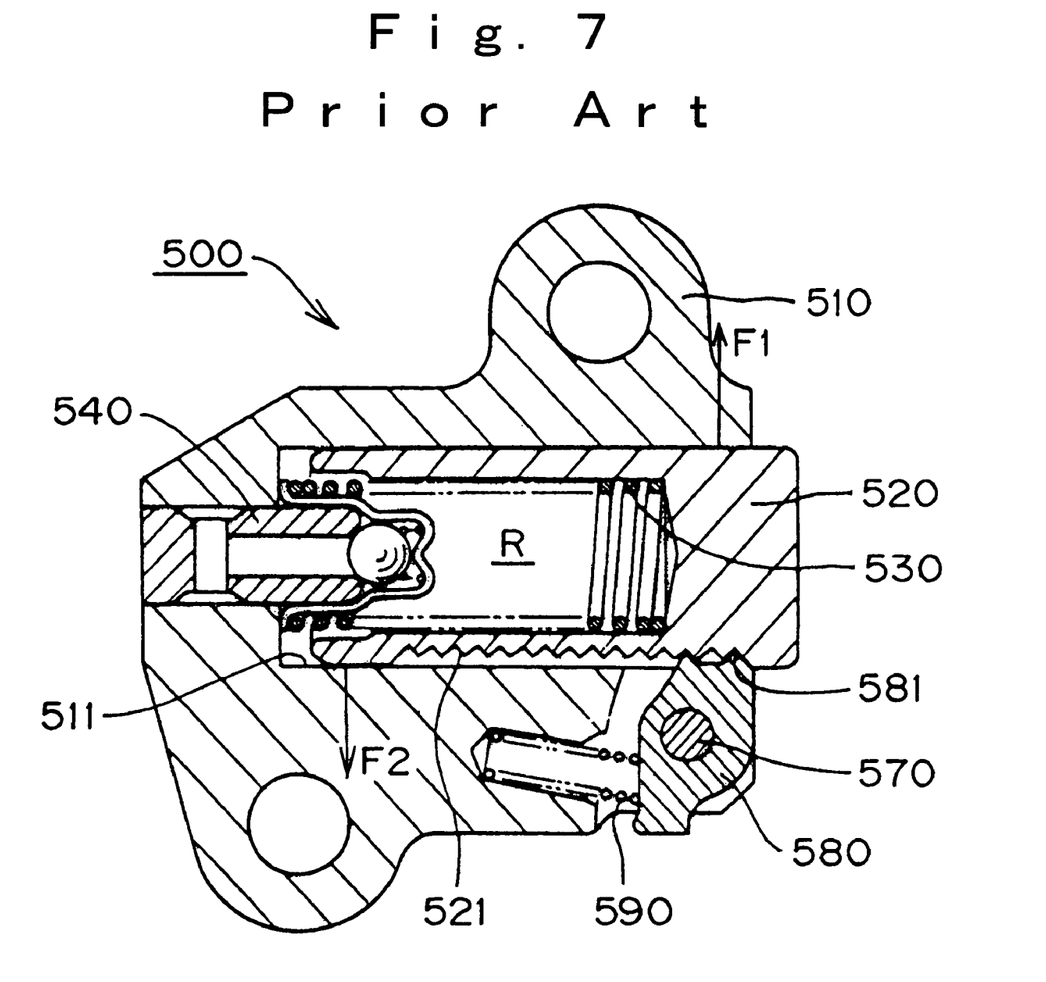
FIG. 7 is a cross-sectional view of a conventional hydraulic tensioner.

As shown in FIG. 7, in a conventional hydraulic tensioner 500, a cylindrical plunger 520 is slidable in a plunger-accommodating hole 511 formed in a housing 510. A plunger-biasing spring 530, in compression between the plunger and the bottom of the hole, urges the plunger 520 in the protruding direction. A high pressure chamber R, formed by the plunger-accommodating hole 511 and the plunger 520, is filled with oil supplied under pressure from the engine through a check valve unit 540.

The high pressure oil chamber may be incompletely filled with oil when the engine is started. Under this condition, backlash noise is generated when the plunger of the tensioner retracts rapidly as a result of impact applied to the plunger by the timing chain. This rapid retracting movement of the plunger 520 can be prevented by a ratchet mechanism. In the tensioner of FIG. 7, the ratchet mechanism comprises teeth 521 formed on the plunger, a pawl 580, pivoted on a pin 570 extending from the housing 510, and a spring 590, which biases the ratchet pawl 580 so its teeth 581 approach the plunger teeth 521.

As shown in FIG. 7, when the ratchet mechanism is operating to prevent retraction of the plunger, the engagement of the pawl teeth 581 with the ratchet teeth 521 of the plunger, generates unbalanced loads F1 and F2. These unbalanced loads can cause localized wear of the housing, especially if the housing is composed of a material such as aluminum.

Furthermore, the performance of the conventional hydraulic tensioner 500, in response to a change in tension in a timing chain depends, to a significant extent, on meshing of the ratchet teeth 521 with the pawl teeth 581. Smooth meshing requires high machining accuracy in the formation of the ratchet mechanism, and especially, accurate mounting of the supporting pin 570, and accurate positioning of the pin-receiving hole of the pawl. Achievement of the required accuracy is difficult.

Thus, objects of the invention are to provide a simple retraction-limiting mechanism which reliably prevents backlash noise upon starting of an engine, to solve the above-mentioned problems encountered in the manufacture of conventional hydraulic tensioners, to simplify manufacture of the tensioner and avoid the difficulties resulting from the requirement for high machining accuracy in the formation of the ratchet mechanism, and to reduce wear of tensioner components.

SUMMARY OF THE INVENTION

The hydraulic tensioner in accordance with the invention corresponds to a convention hydraulic tensioner in certain respects, particularly in that it comprises a housing having a plunger-accommodating hole, a plunger, slidable in the plunger-accommodating hole and protruding therefrom, a plunger-biasing spring in a high pressure oil chamber formed by the plunger and the plunger-accommodating hole, the spring urging the plunger in the protruding direction, and a check valve unit permitting flow of oil into the high pressure oil chamber and blocking flow of oil out of the chamber. The tensioner differs from the conventional tensioner in that, the ratchet mechanism is eliminated, and the plunger backstopping function is achieved by an annular groove formed in the outer circumference of a circular, cylindrical plunger, and a resilient, radially expansible, split ring disposed in the annular groove and biased against a circular, cylindrical, inner circumferential wall of the plunger-accommodating hole. The ring fits into the groove with an axial clearance in the groove width direction and a radial clearance in the groove depth direction.

The tensioner is capable of applying proper tension to a timing chain or the like in the same manner as the conventional tensioner. However, when the plunger receives an impact from the timing chain upon engine start-up, the sliding resistance between the split ring and the inner circumferential wall of the plunger-accommodating hole against which the ring is resiliently biased, blocks rapid retraction of the plunger, preventing backlash noise. However, the ring allows the plunger-biasing spring to cause the plunger to protrude during normal tensioner operation as the chain length gradually increases, and the axial clearance allows the check valve unit to operate normally.

The backstop structure of the ring type hydraulic tensioner according to the invention is much simpler than the ratchet mechanism used in conventional hydraulic tensioners, uses fewer parts, and reduces the requirements for machining accuracy and accuracy of assembly.

DETAILED DESCRIPTION OF THE PREFERRED EMBODIMENTS

When an impact is applied to the plunger by the timing chain upon engine start-up, the tensioner in accordance with the invention prevents backlash noise by means of a simple backstop mechanism which comprises a resilient, C-shaped, split ring, which fits into an annular circumferential groove in the plunger of the tensioner with both axial and radial clearances. The ring is resiliently biased toward the inner circumferential wall of the plunger-accommodating hole in the tensioner housing. The invention is applicable to various kinds of tensioners. For example, the tensioner can be an outwardly mounted tensioner, mounted on the outside of an engine block, or an internally mounted tensioner, incorporated into an engine inside the engine block.

Figure 1:
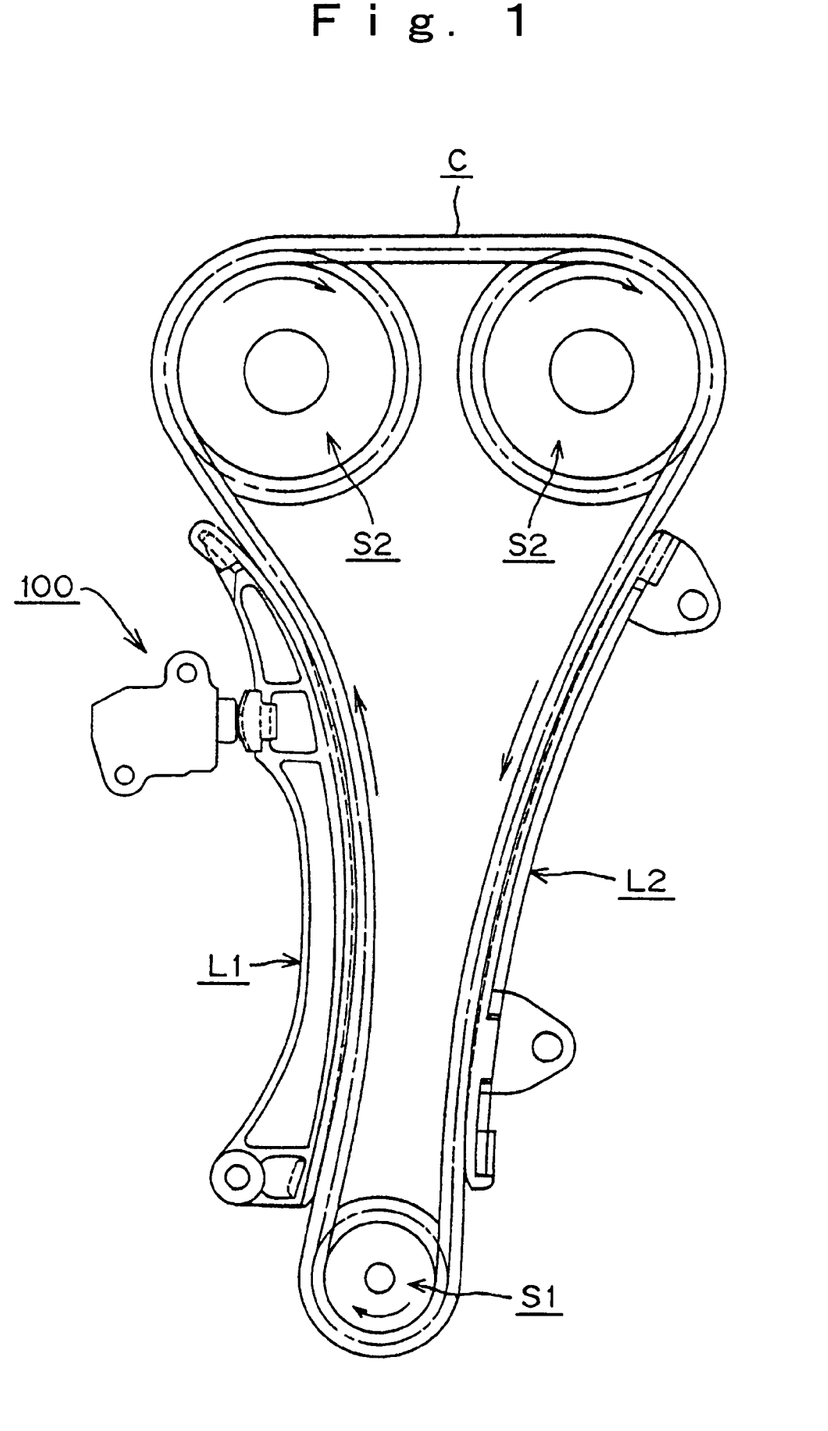
FIG. 1 is a schematic elevational view of the timing drive of a dual overhead cam internal combustion engine incorporating a ring type hydraulic tensioner in accordance with the invention.
Figure 2:
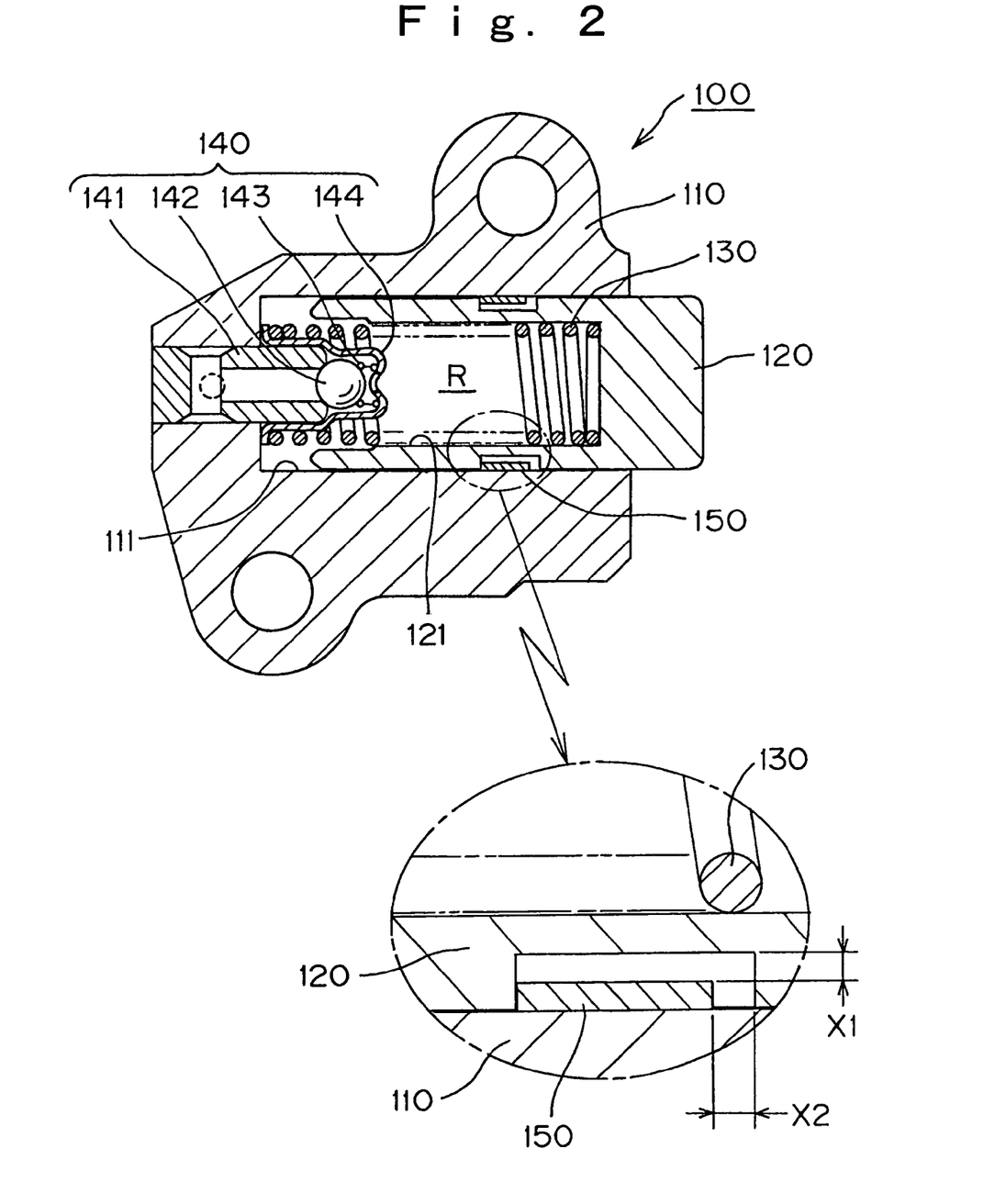
FIG. 2 is a cross-sectional view of a ring type hydraulic tensioner in accordance with a first embodiment of the invention.
Figure 3:
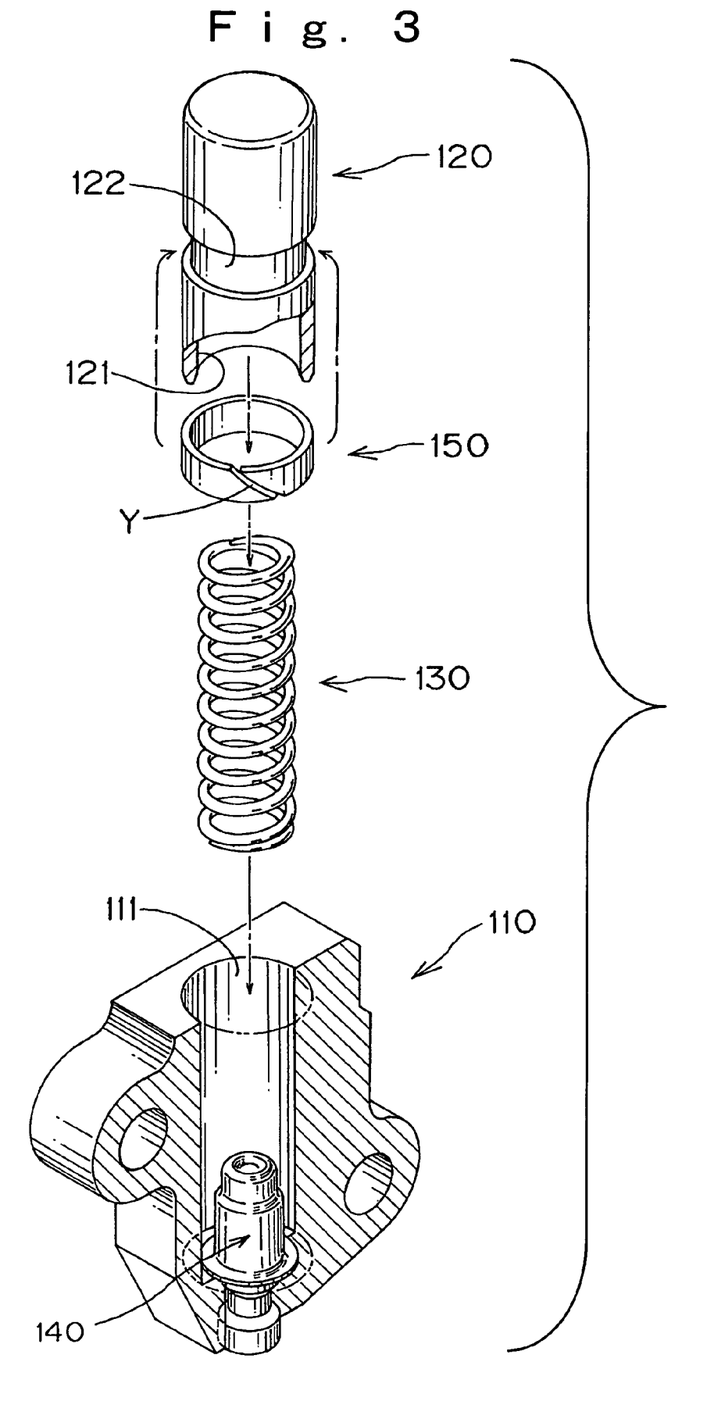
FIG. 3 is an exploded view of the ring type hydraulic tensioner shown in FIG. 2.

As shown in FIGS. 1-3, a ring type hydraulic tensioner 100, in accordance with a first embodiment of the invention, is attached to an engine (not shown) adjacent the slack side of a timing chain C. The chain is driven by a crankshaft sprocket S1, and in mesh with two camshaft sprockets S2. Arrows show the directions of rotation of the sprockets and the direction of movement of the chain. A plunger 120 protrudes slidably from the tensioner housing 110, and applies tension to the slack side of the chain, through a lever L1, pivoted on the engine, by pressing against the back of the lever at a location spaced from the lever's pivot axis. A fixed guide L2 guides the tension side of the timing chain.

As shown in FIG. 2, the plunger 120, the outer surface of which is generally in the form of a circular cylinder with an annular, circumferential groove, fits slidably a cylindrical plunger-accommodating hole 111 formed in the housing 110. The plunger has a interior hollow space 121, open at one end and closed at the other, for receiving a plunger-biasing spring 130. The spring is in compression between the inner end of the plunger-accommodating hole and the closed end of the interior space 121 of the plunger, and urges the plunger in the protruding direction. The tip of the plunger is always outside the plunger-accommodating hole 111.

The plunger-accommodating hole 111 and the hollow space 121 inside the plunger together form a high pressure chamber R, which is filled with oil supplied from the engine through a check valve unit 140.

The check valve unit 140, which protrudes into the high pressure chamber R, blocks reverse flow of oil from the high pressure chamber R. As shown in FIG. 2, the check valve unit 140 comprises a ball seat 141, a check ball 142 opposite to the ball seat 141, a ball-biasing spring 143, which biases the check ball valve 142 against the ball seat 141, and a retainer 144, which supports the ball biasing spring 143 and restricts movement of the check ball valve 142.

In ordinary operation of the tensioner, when an impact acts on the protruding end of the plunger 120 as a result of a change in tension of the timing chain C, the plunger 120 is rapidly pressed in a retracting direction against the biasing force of spring 130. The pressure of the oil in the high pressure chamber R increases and the check ball 142 is pressed against the ball seat 141 so that reverse flow of oil from the high pressure chamber R through the passage of the ball seat 141 is blocked.

However, during engine start-up, the high pressure oil chamber R may not be completely filled with oil, and consequently, the check valve cannot be relied upon to prevent rapid retraction of the plunger. Thus, in the past, ratchet mechanisms have been used to limit reverse movement of the plunger. In this invention, however, as shown in FIGS. 2 and 3, a resilient split ring 150, fits into an annular groove 122 formed in the outer circumference of plunger 120 with a predetermined radial clearance X1 in the groove depth direction, and a predetermined axial clearance X2 in the groove width direction. The resilience of the ring causes it to tend to expand radially so that it is self-biased toward the inner circumferential wall of the plunger-accommodating hole 111 of the tensioner housing.

The ring's relaxed outer diameter is slightly larger than the diameter of the plunger-accommodating hole 111 so that it is resiliently biased against the wall of the plunger-accommodating hole. The radial clearance X1 exists because the ring's inner diameter, when it is in contact with the wall of the plunger-accommodating hole 111, is larger than the diameter of the bottom of the annular groove 122. As shown in FIG. 3, the ring is in the form of a band of steel having a rectangular cross-section which is narrow in the radial direction and elongated axially. The ring is subjected to heat treatment, and provided with a slot Y, which is preferably oblique with respect to the axial direction of the plunger. The split ring 150 exhibits rigidity, wear resistance and durability so that it can remain resistant to sliding on the inner circumferential wall of the plunger-accommodating hole 111 for a long period of time.

The split ring 150 is fitted into the annular groove 122 of the cylindrical plunger 120, accommodated in the plunger-accommodating hole 111, and (as illustrated in exaggerated form in FIG. 4) self-biased by its diameter-increasing biasing force F3 toward the inner circumferential wall of the plunger-accommodating hole 111. When the ring is in this condition, the radial clearance X1 ensures that it out of contact with the bottom of the annular groove of the plunger. The axial clearance X2 allows the plunger to slide freely through a predetermined distance equal to the clearance X2.

Figure 4:
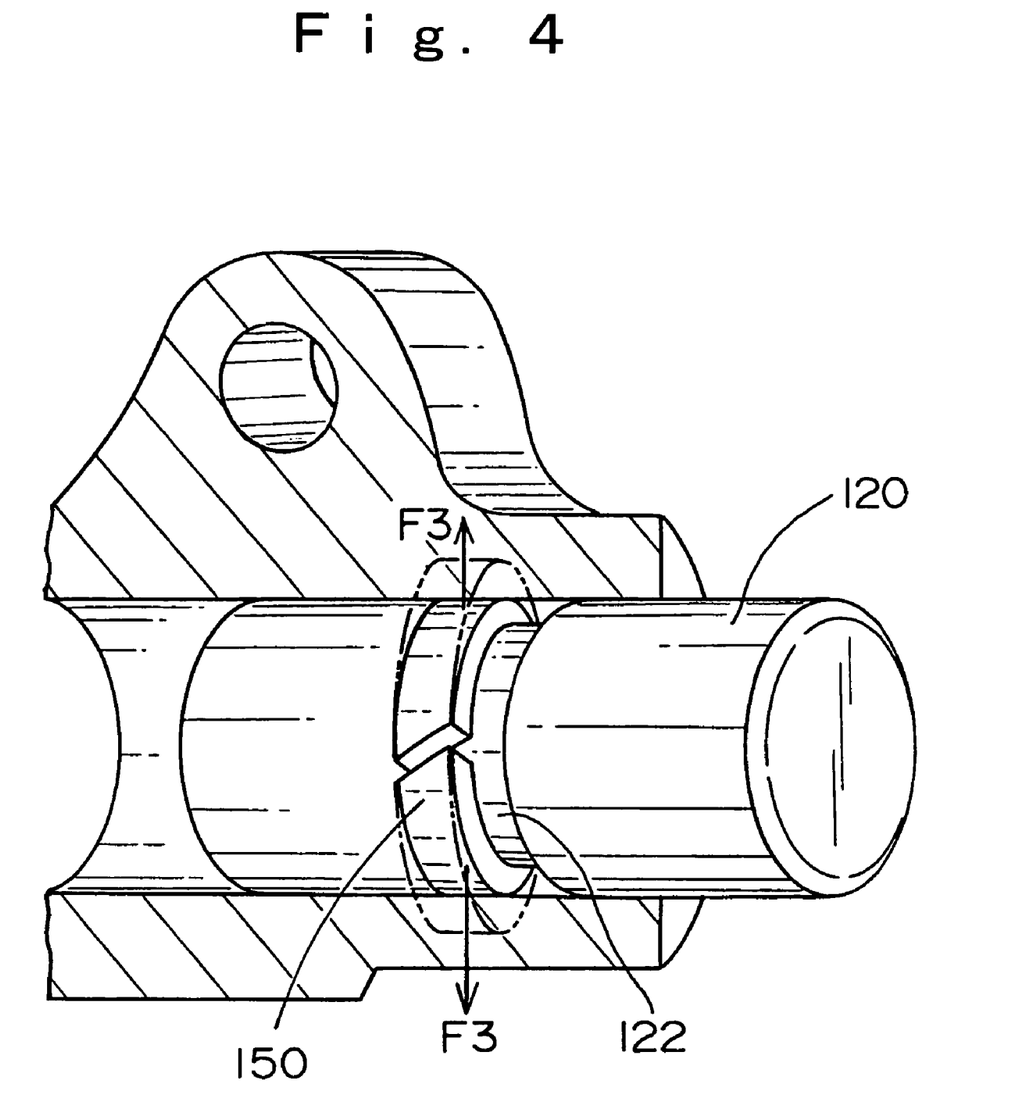
FIG. 4 is a fragmentary perspective view, partly in section, illustrating the function of the C-shaped ring utilized in the first embodiment.

When the tensioner is subject to an impact from the timing chain upon engine start-up, the sliding resistance between the ring 150 and the inner circumferential wall of the plunger-accommodating hole 111 exerts a backstop function, preventing rapid retraction of the plunger 120 beyond the range determined by the axial clearance X2. On the other hand, during normal operation of the engine following start-up, the ring allows the plunger to move in the protruding direction under the force applied to the plunger by the plunger-biasing spring 130, and the check valve unit limits retraction of the plunger since the high pressure oil chamber R will be full of oil during normal operation. Even during normal engine operation, however, the axial clearance X2 imposes a limit on retracting movement of the plunger. Thus, the tensioner is able to prevent backlash noise during engine-start-up, and maintains proper tension in the timing chain during normal engine operation after start-up.

The backstop structure, in which a split ring 150 is fitted into an annular groove 122 on the outer circumference of the plunger 120 is much simpler than the conventional backstop structure, which requires a pawl-supporting pin, a toothed pawl and ratchet teeth formed on the plunger. The ring type hydraulic tensioner 100 in accordance with the invention significantly reduces the requirement for accuracy in the machining and assembly of a tensioner, reduces the number of parts required, makes assembly of the tensioner much easier, and reduces wear.

Figure 5:
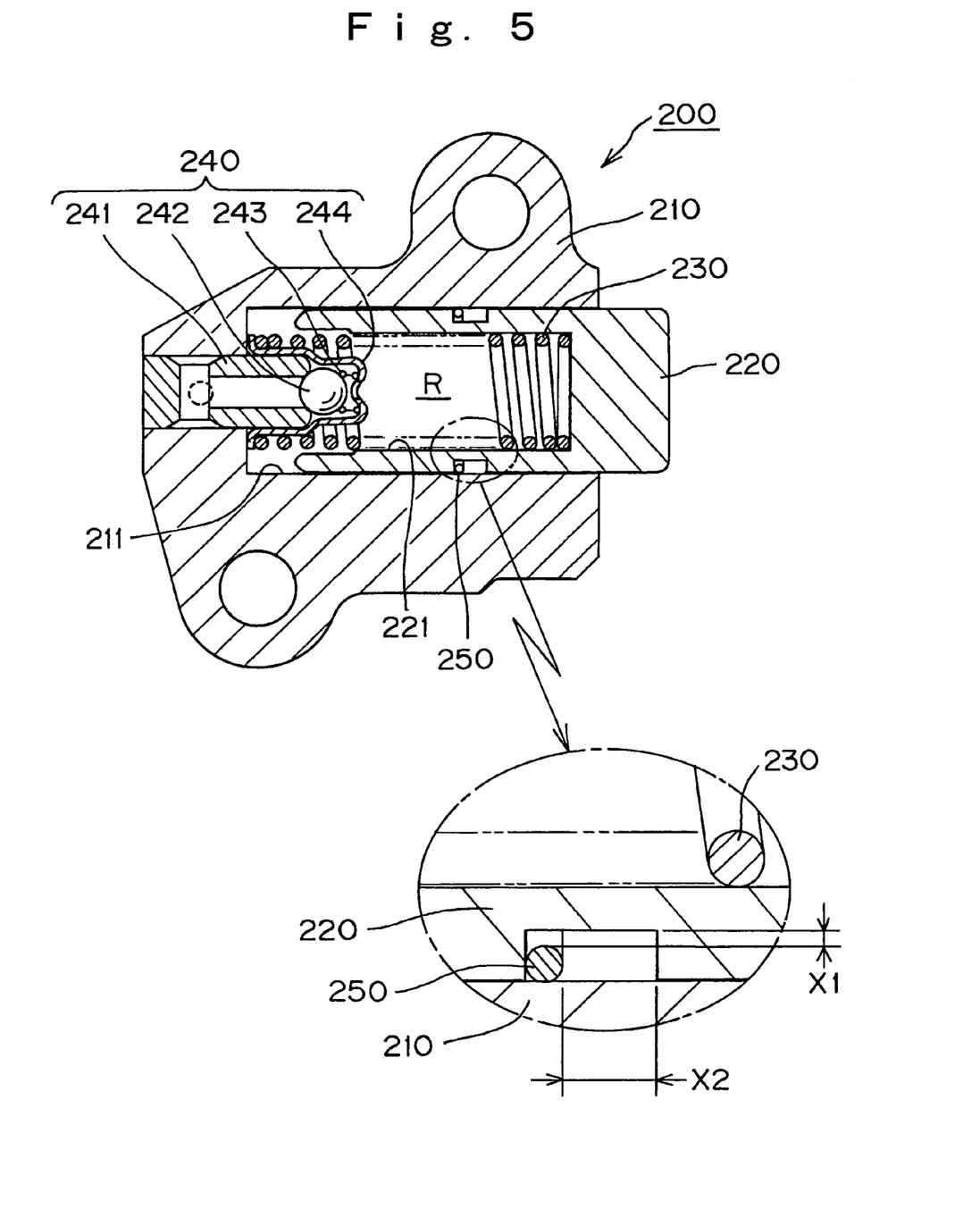
FIG. 5 is a cross-sectional view of a ring type hydraulic tensioner in accordance with a second embodiment of the invention.
Figure 6:
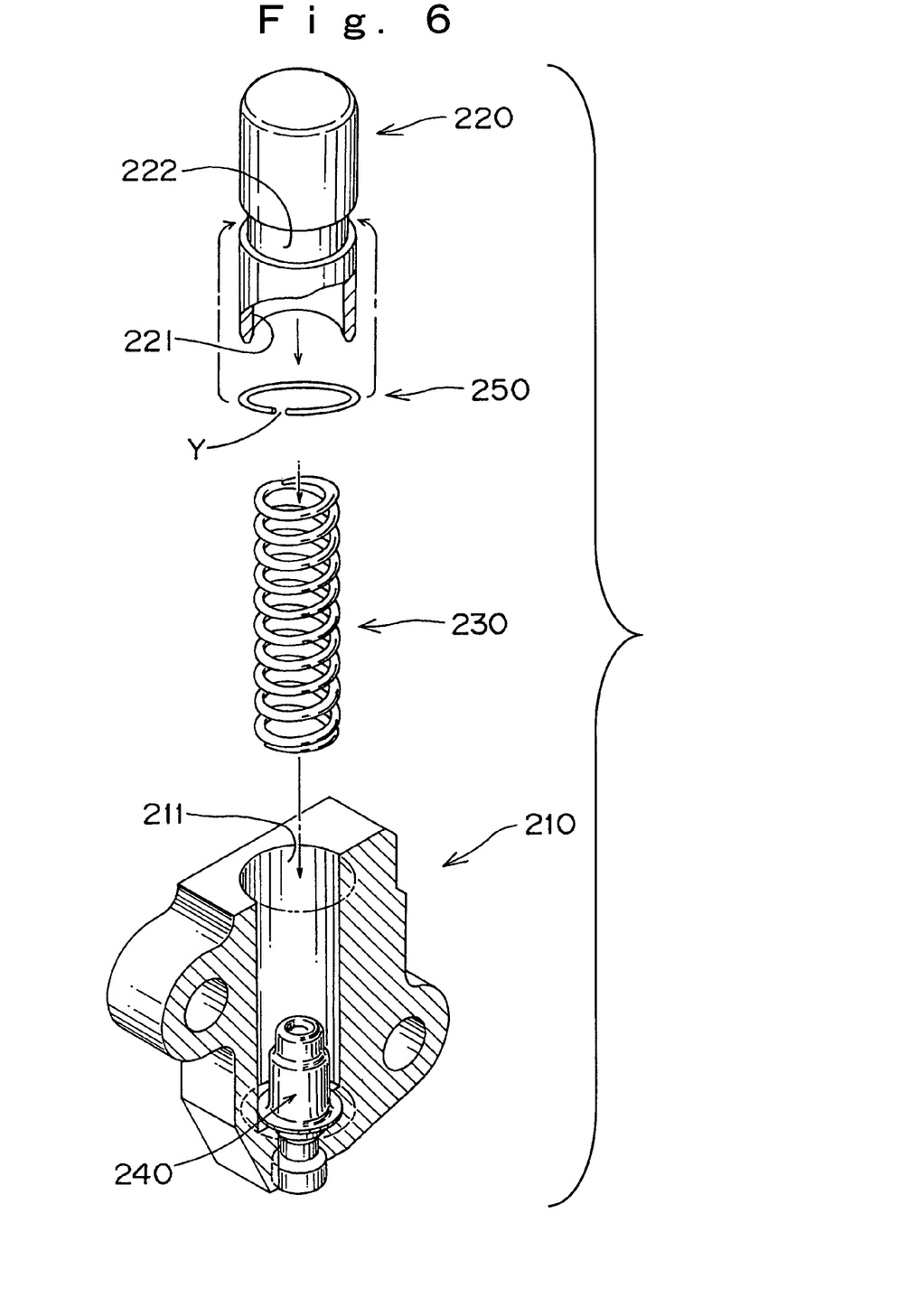
FIG. 6 is an exploded view of the ring type hydraulic tensioner shown in FIG. 5.

Another embodiment of a ring type hydraulic tensioner in accordance with the invention, is illustrated in FIGS. 5 and 6.

This tensioner 200 is designed to be mounted on an engine block wall in the same way in which tensioner 100 is mounted, but can be either internally or externally mounted.

Tensioner 200 differs from tensioner 100 primarily in that its split ring 250 has a circular cross-section, and is in the form of a wire. The components of tensioner 200 which correspond to components of tensioner 100 are correspondingly numbered by reference numerals in the 200 series.

As in the case of tensioner 100, the relaxed outer diameter of ring 250 is slightly larger than the diameter of the plunger-accommodating hole 211 so that it is resiliently biased against the wall of the plunger-accommodating hole. The ring=s inner diameter, when it is in contact with the wall of the plunger-accommodating hole 211, is larger than the diameter of the bottom of the annular groove 222. The ring is subjected to heat treatment, and provided with a slot Y, as shown in FIG. 6. The split ring 250 exhibits rigidity, wear resistance and durability so that it can remain resistant to sliding on the inner circumferential wall of the plunger-accommodating hole 211 for a long period of time.

The split ring 250 is fitted into the annular groove 222 of the cylindrical plunger 220, accommodated in the plunger-accommodating hole 211, and self-biased by its diameter-increasing biasing force toward the inner circumferential wall of the plunger-accommodating hole 211. When the ring is in this condition, a radial clearance ensures that it out of contact with the bottom of the annular groove of the plunger. The axial clearance X2, which is greater than the corresponding clearance in the first embodiment, allows the plunger to slide freely through a predetermined distance equal to the clearance X2.

When the tensioner is subject to an impact from the timing chain upon engine start-up, the sliding resistance between the ring 250 and the inner circumferential wall of the plunger-accommodating hole 211 exerts a backstop function, preventing rapid retraction of the plunger 120 beyond the range determined by the axial clearance X2. On the other hand, during normal operation of the engine following start-up, the ring allows the plunger to move in the protruding direction under the force applied to the plunger by the plunger-biasing spring 230, and the check valve unit 240 limits retraction of the plunger since the high pressure oil chamber R will be full of oil during normal operation. Even during normal engine operation, the axial clearance X2 imposes a limit on retracting movement of the plunger. Thus, the tensioner is able to prevent backlash noise during engine-start-up, and maintains proper tension in the timing chain during normal engine operation after start-up. The backstop structure, in which the split ring 250 is fitted into an annular groove 222 on the outer circumference of the plunger 220, is also much simpler than the conventional backstop structure, significantly reduces the requirement for accuracy in the machining and assembly of a tensioner, reduces the number of parts required, makes assembly of the tensioner much easier, and reduces wear.

I claim:

1. A ring type hydraulic tensioner comprising:
    a housing having a plunger-accommodating hole having a cylindrical inner circumferential wall;
    a circular, cylindrical plunger, slidable along an axis in the plunger-accommodating hole and protruding therefrom;
    a plunger-biasing spring in an oil chamber formed by the plunger and the plunger-accommodating hole, said spring urging the plunger in the protruding direction; and
    a check valve unit permitting flow of oil into said high pressure oil chamber and blocking flow of oil out of said chamber;
    wherein the improvement comprises:
        an annular groove formed in the outer circumference of the plunger, said groove having a bottom facing, but spaced from, said cylindrical inner circumferential wall of the plunger-accommodating hole and axially spaced, opposed, end walls; and
        a resilient, radially expansible, split steel ring disposed in said annular groove, said ring having an outer diameter, when relaxed, greater than the diameter of said inner circumferential wall of the plunger-accommodating hole and being biased by its resilience so that it exerts a radial outward biasing force against said cylindrical inner circumferential wall of the plunger-accommodating hole;
        said ring being slidable, with sliding resistance, on said cylindrical inner circumferential wall of the plunger-accommodating hole, and fitting in said groove with a predetermined axial clearance in the groove width direction and a predetermined radial clearance between the ring and the bottom of the groove, in the groove depth direction, said ring being engageable by said end walls of the groove;
        said predetermined radial clearance existing along the entire axial length of the ring;
        said predetermined axial clearance allowing the plunger to protrude and retract within a predetermined range of movement with reference to the position of the ring; and
        the sliding resistance between the ring and the inner circumferential wall of the plunger-accommodating hole in the protruding and retracting directions when said ring is engaged respectively by said end walls of the groove being due solely to said biasing force, and imposing increased resistance to protruding and retracting movement of the plunger beyond said predetermined range.

2. A ring type hydraulic tensioner according to claim 1, in which said spaced, opposed end walls of the groove are disposed in planes to which said axis is perpendicular.

3. In the timing drive of an internal combustion engine having a timing chain transmitting power from an engine crankshaft to at least one valve-operating camshaft, a ring type hydraulic tensioner arranged to maintain tension in the timing chain, the tensioner comprising:
    a housing having a plunger-accommodating hole having a cylindrical inner circumferential wall;
    a circular, cylindrical plunger, slidable along an axis in the plunger-accommodating hole and protruding there from;
    a plunger-biasing spring in an oil chamber formed by the plunger and the plunger-accommodating hole, said spring urging the plunger in the protruding direction; and
    a check valve unit permitting flow of oil into said high pressure oil chamber and blocking flow of oil out of said chamber;
    wherein the improvement comprises:
        an annular groove formed in the outer circumference of the plunger, said groove having a bottom facing, but spaced from, said cylindrical inner circumferential wall of the plunger-accommodating hole and axially spaced. opposed end walls; and
        a resilient, radially expansible, split steel ring disposed in said annular groove, said ring having an outer diameter, when relaxed, greater than the diameter of said inner circumferential wall of the plunger-accommodating hole and being biased by its resilience so that it exerts a radial outward biasing force against said cylindrical inner circumferential wall of the plunger-accommodating hole;
        said ring being slidable, with sliding resistance, on said cylindrical inner circumferential wall of the plunger-accommodating hole, and fitting in said groove with a predetermined axial clearance in the groove width direction and a predetermined radial clearance, between the ring and the bottom of the groove, in the groove depth direction, said ring being engageable by said end walls of the groove;

said predetermined radial clearance existing along the entire axial length of the ring;

said predetermined axial clearance allowing the plunger to protrude and retract within a predetermined range of movement with reference to the position of the ring, said predetermined range corresponding to tension variations in said chain during normal engine operation; and the sliding resistance between the ring and the inner circumferential wall of the plunger-accommodating hole in the protruding and retracting directions when said ring is engaged respectively by said end walls of the groove being due solely to said biasing force, and imposing increased resistance to protruding and retracting movement of the plunger beyond said predetermined range during engine start-up.

4. A ring type hydraulic tensioner according to claim 3, in which said spaced, opposed end walls of the groove are disposed in planes to which said axis is perpendicular.

* * * * *